United States Patent
Li et al.

(10) Patent No.: US 11,051,020 B2
(45) Date of Patent: Jun. 29, 2021

(54) IMAGE DECODING METHOD AND APPARATUS USING PROJECTION-TYPE BASED QUANTISATION PARAMETERS IN IMAGE CODING SYSTEM FOR 360-DEGREE VIDEO

(71) Applicant: LG ELECTRONICS INC., Seoul (KR)

(72) Inventors: Ling Li, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/628,913

(22) PCT Filed: Jul. 4, 2018

(86) PCT No.: PCT/KR2018/007542
§ 371 (c)(1),
(2) Date: Jan. 6, 2020

(87) PCT Pub. No.: WO2019/009600
PCT Pub. Date: Jan. 10, 2019

(65) Prior Publication Data
US 2020/0145663 A1    May 7, 2020

Related U.S. Application Data

(60) Provisional application No. 62/528,453, filed on Jul. 4, 2017.

(51) Int. Cl.
*H04N 19/126* (2014.01)
*H04N 19/132* (2014.01)
(Continued)

(52) U.S. Cl.
CPC ........ *H04N 19/126* (2014.11); *H04N 19/132* (2014.11); *H04N 19/176* (2014.11); *H04N 19/46* (2014.11); *H04N 19/91* (2014.11)

(58) Field of Classification Search
CPC .. H04N 19/124; H04N 19/126; H04N 19/132; H04N 19/176; H04N 19/46;
(Continued)

(56) References Cited

U.S. PATENT DOCUMENTS

| | | | |
|---|---|---|---|
| 10,230,957 B2 * | 3/2019 | Chou | H04N 19/597 |
| 2018/0242016 A1 * | 8/2018 | Lee | H04N 19/86 |

(Continued)

FOREIGN PATENT DOCUMENTS

| | | |
|---|---|---|
| KR | 10-20150113523 A | 5/2012 |
| KR | 10-20170031202 A | 10/2014 |
| WO | 2015-030967 A1 | 11/2015 |

OTHER PUBLICATIONS

Zhang et al. "AhG8: segmented sphere projection (SSP) for 360-degree video content" Joint Video Exploration Team (JVET) of ITU-T SG 16 WP 3 and ISO/IEC JTC 1/SC 29/WG 11 4th Meeting: Chengdu, CN, Oct. 15-21, 2016, Document: JVET-D0030, 5 Pages.*

(Continued)

*Primary Examiner* — Nathnael Aynalem
(74) *Attorney, Agent, or Firm* — Dentons US LLP

(57) ABSTRACT

An image decoding method that is performed by a decoding apparatus of the present invention comprises the steps of: receiving 360-degree video information; deriving a projection type of a projected picture based on the 360-degree video information; deriving a weight map of the projected picture based on the projection type; deriving quantisation processing units of the projected picture; deriving DAQP for the respective quantisation processing units based on the
(Continued)

weight map; and decoding the respective quantisation processing units based on the DAQP.

11 Claims, 12 Drawing Sheets

(51) Int. Cl.
  *H04N 19/176* (2014.01)
  *H04N 19/46* (2014.01)
  *H04N 19/91* (2014.01)
(58) Field of Classification Search
  CPC ...... H04N 19/597; H04N 19/70; H04N 19/91;
       H04N 19/172; H04N 19/174; H04N
       19/463; H04N 19/593
  USPC ........................................ 375/240.01–240.29
  See application file for complete search history.

(56) References Cited

U.S. PATENT DOCUMENTS

| | | | | |
|---|---|---|---|---|
| 2018/0249076 A1* | 8/2018 | Sheng | .................. | H04N 19/184 |
| 2018/0268517 A1* | 9/2018 | Coban | .................... | G06T 17/00 |
| 2018/0270468 A1* | 9/2018 | Zhou | .................. | H04N 5/23238 |
| 2018/0278936 A1* | 9/2018 | Hendry | .................. | H04N 19/19 |
| 2018/0288356 A1* | 10/2018 | Ray | ...................... | H04N 19/124 |
| 2019/0007684 A1* | 1/2019 | Van Der Auwera | ...... | G06T 9/00 |
| 2020/0092582 A1* | 3/2020 | Xiu | ....................... | G06T 3/0087 |
| 2020/0169753 A1* | 5/2020 | Xiu | ..................... | H04N 19/597 |

OTHER PUBLICATIONS

Racapé et al. "AHG8: adaptive QP for 360 video coding" Joint Video Exploration Team (JVET) of ITU-T SG 16 WP 3 and ISO/IEC JTC 1/SC 29/WG 11 6th Meeting: Hobart, AU, Mar. 31-Apr. 7, 2017, Document: JVET-F0038_r1, 3 Pages.*
Youvalari et al. "Analysis of Regional Down-Sampling Methods for Coding of Omnidirectional Video" 2016 IEEE, 5 Pages.*
Coban et al. "AHG8: Adjusted cubemap projection for 360-degree video" Joint Video Exploration Team (JVET) of ITU-T SG 16 WP 3 and ISO/IEC JTC 1/SC 29/WG 11 6th Meeting: Hobart, AU, Mar. 31-Apr. 7, 2017, Document: JVET-F0025, 6 Pages.*
Boyce et al. "JVET AGH report: 360 video coding tools and test conditions (AHG8)" Joint Video Exploration Team (JVET) of ITU-T SG 16 WP 3 and ISO/IEC JTC 1/SC 29/WG 11 6th Meeting: Hobart, AU, Mar. 31-Apr. 7, 2017 , Document: JVET-F0008v2, 7 Pages.*
Hendry, Joint Video Exploration Team (JVET) of ITU-T SG 16 WP 3 and ISO/IEC JTC 1/SC 291WG 11, AHG8: Adaptive QP for ERP 360 video, JVET-F0049-r1, 6th meeting, Mar. 31-Apr. 7, 2017, Hobart, Australia.
Hendry, Joint Video Exploration Team (JVET) of ITU-T SG 16 WP 3 and ISO/IEC JTC 1/SC 29/WG 11, AHG8: Adaptive QP for ERP 360 video, JVET-F1003-r1 for Hobart meeting, Mar. 31-Apr. 7, 2017, Hobart, Australia.
Yan Ye, Algorithym descriptions of projection format conversion an video quality metrics in 360Lib, Joint Video Exploration Team (JVET) of ITU-T SG 16 WP 3 and ISO/IEC JTC 1/SC 29/WG 11, JVET-F1003-v1, Mar. 31-Apr. 7, 2017, Hobart, Australia.
G. Sullivan, et al., JVET of ITU-T SG 16 WP 3 and ISO/IEC JTC 1/ SC 29/WG11, 6th Meeting, "Meeting Report of the the 6th meeting of the Joint Video Exploration Team (JVET)" Hobart, AU, Mar. 31-Apr. 7, 2017, Responsible Coordinators. (83 Pages).

* cited by examiner

FIG. 2
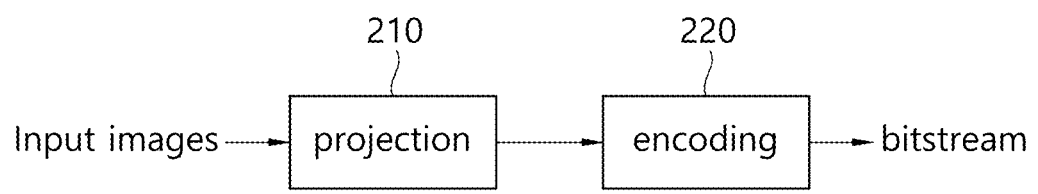
(a)
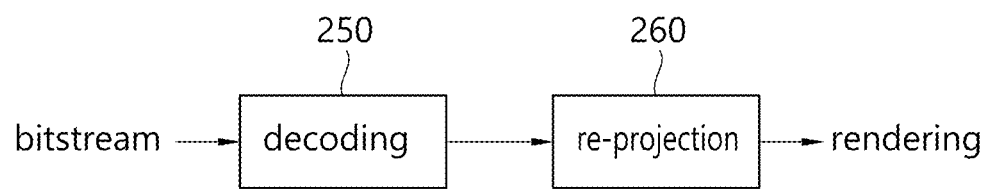
(b)

FIG. 7A
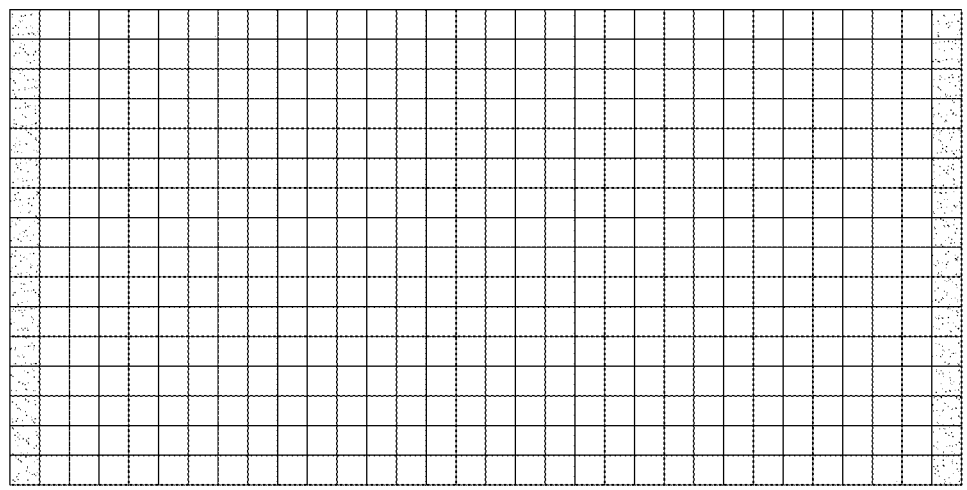
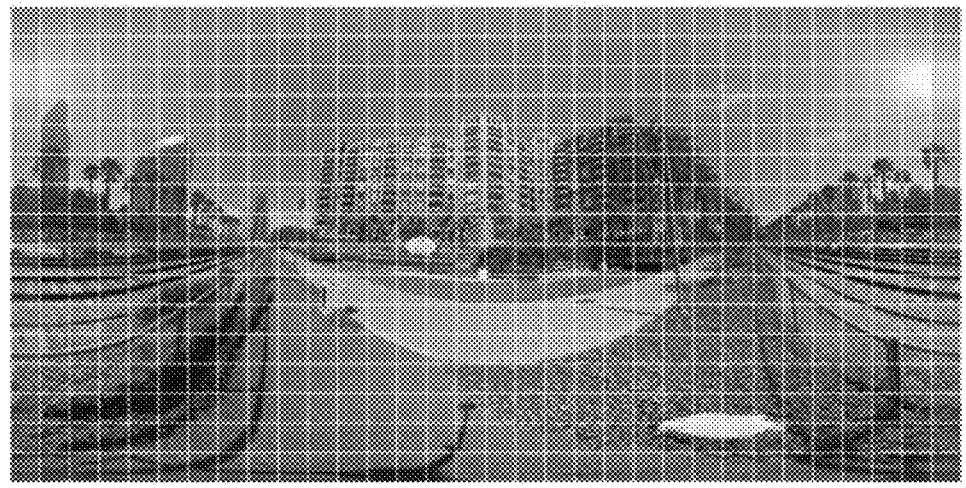

FIG. 7B
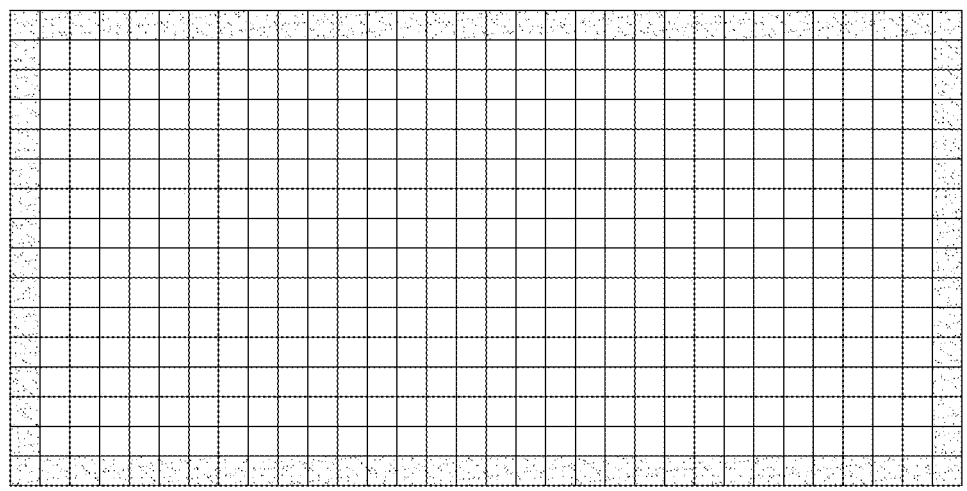
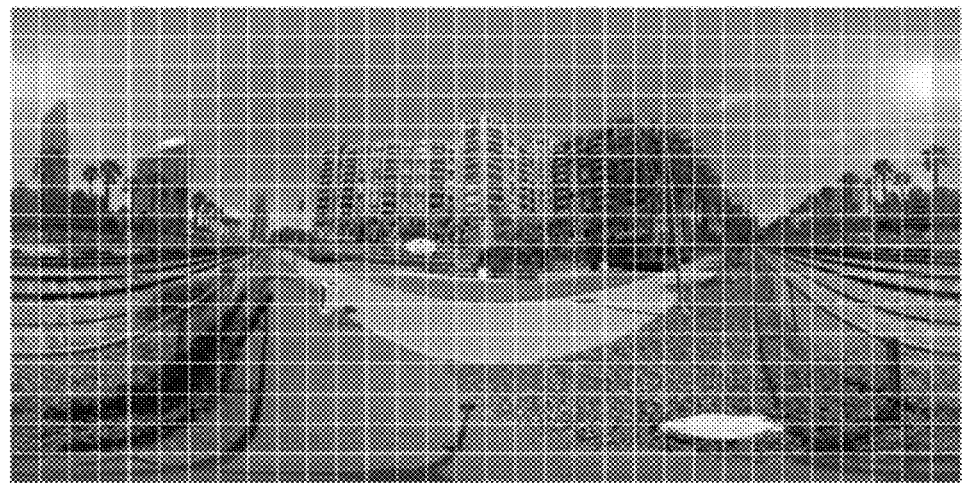

FIG. 7C
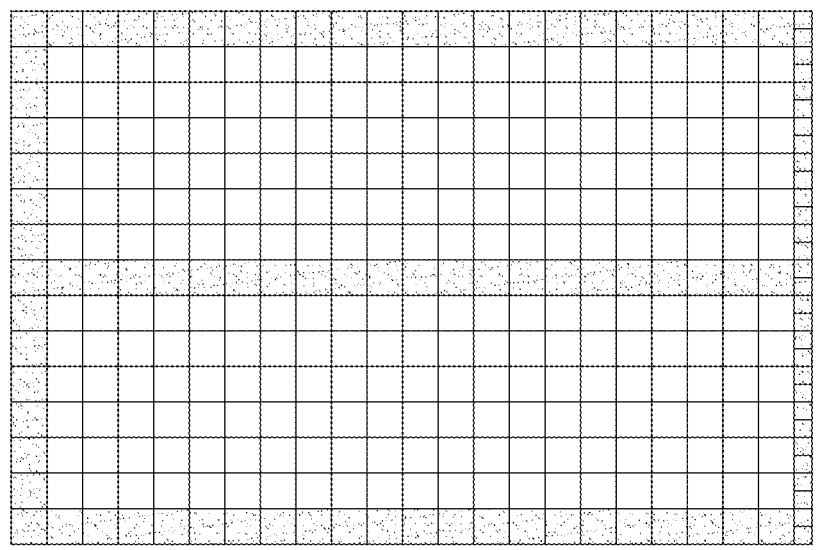
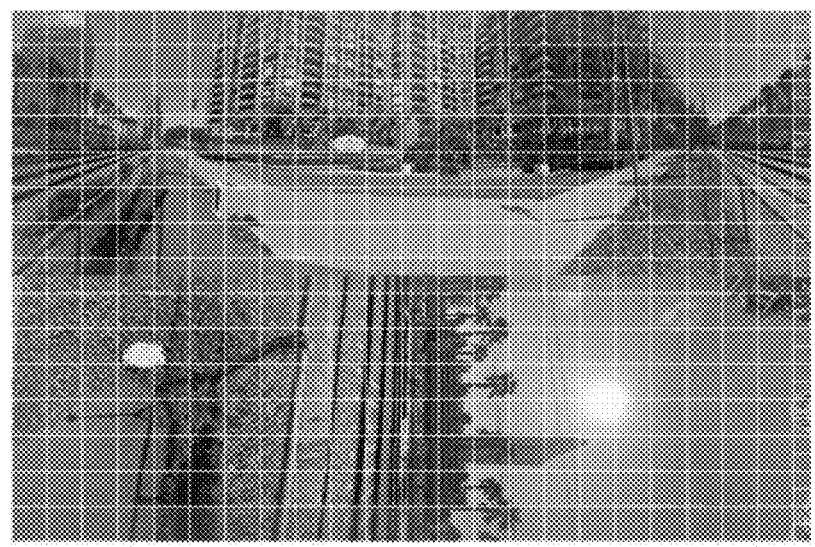

FIG. 7D
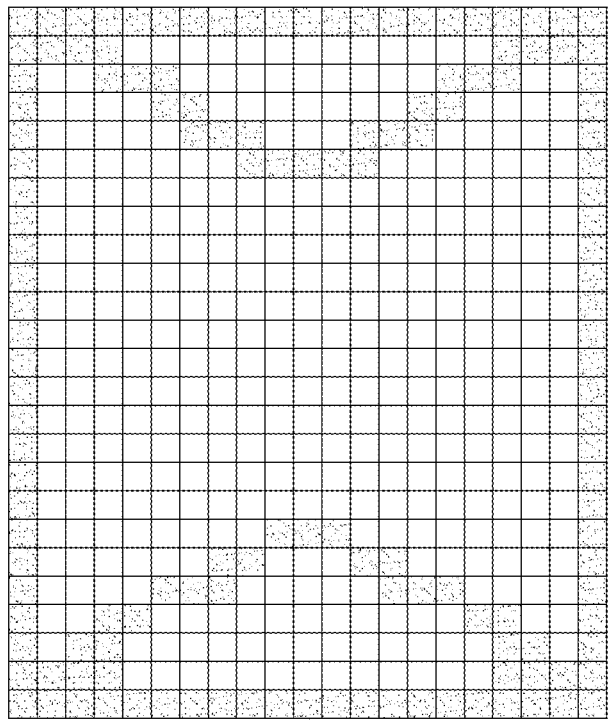
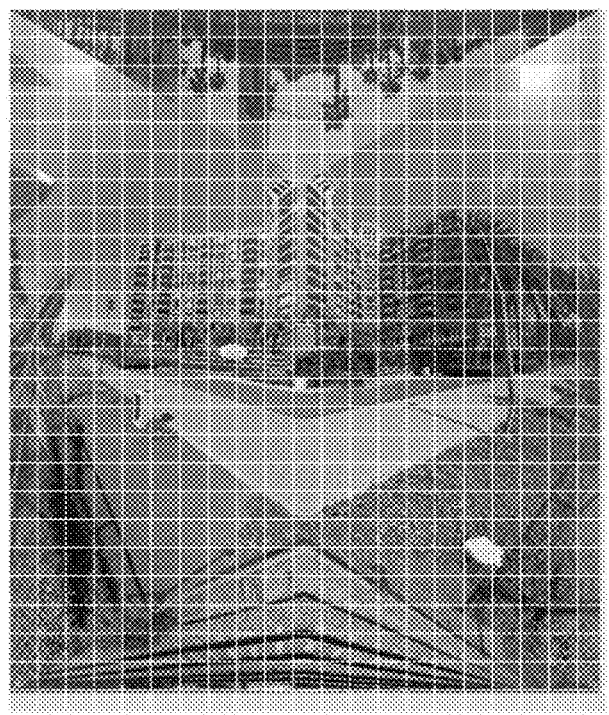

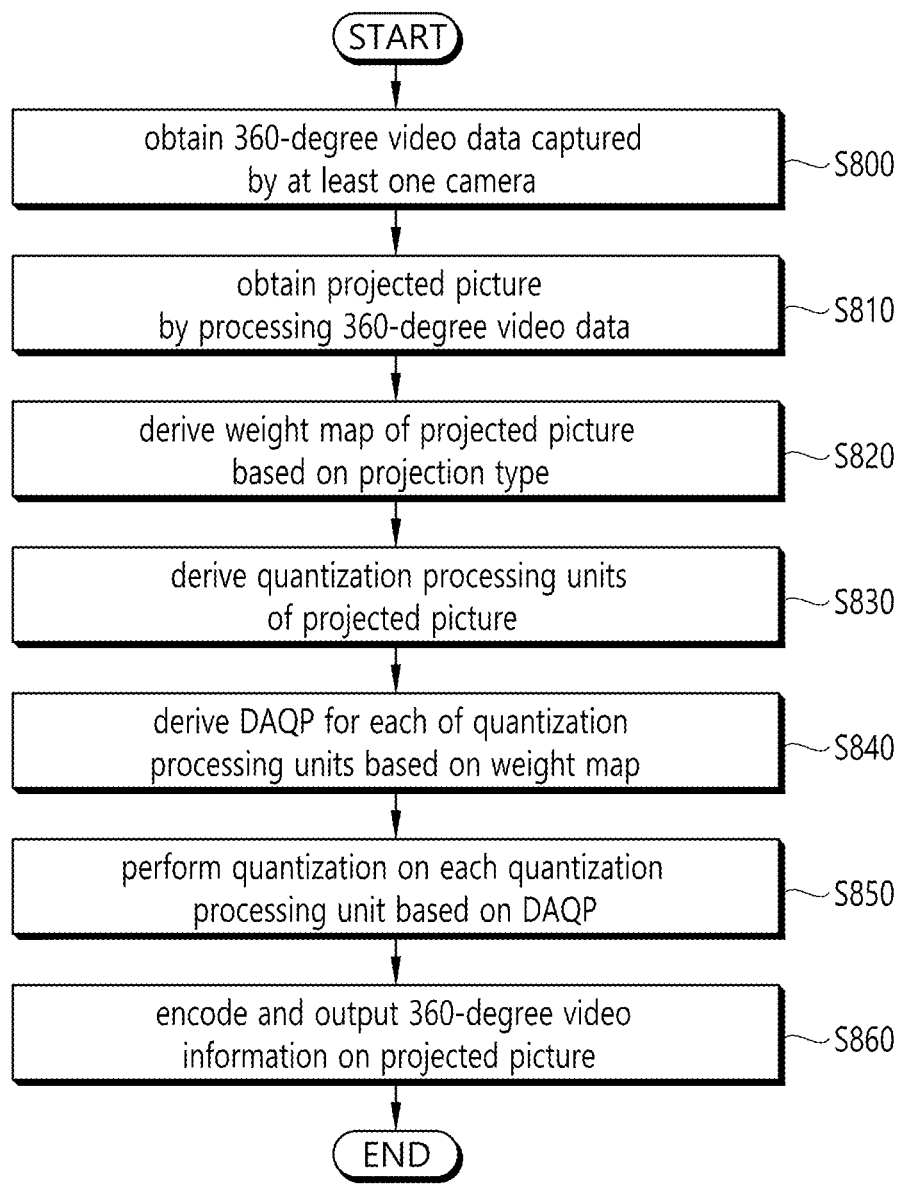

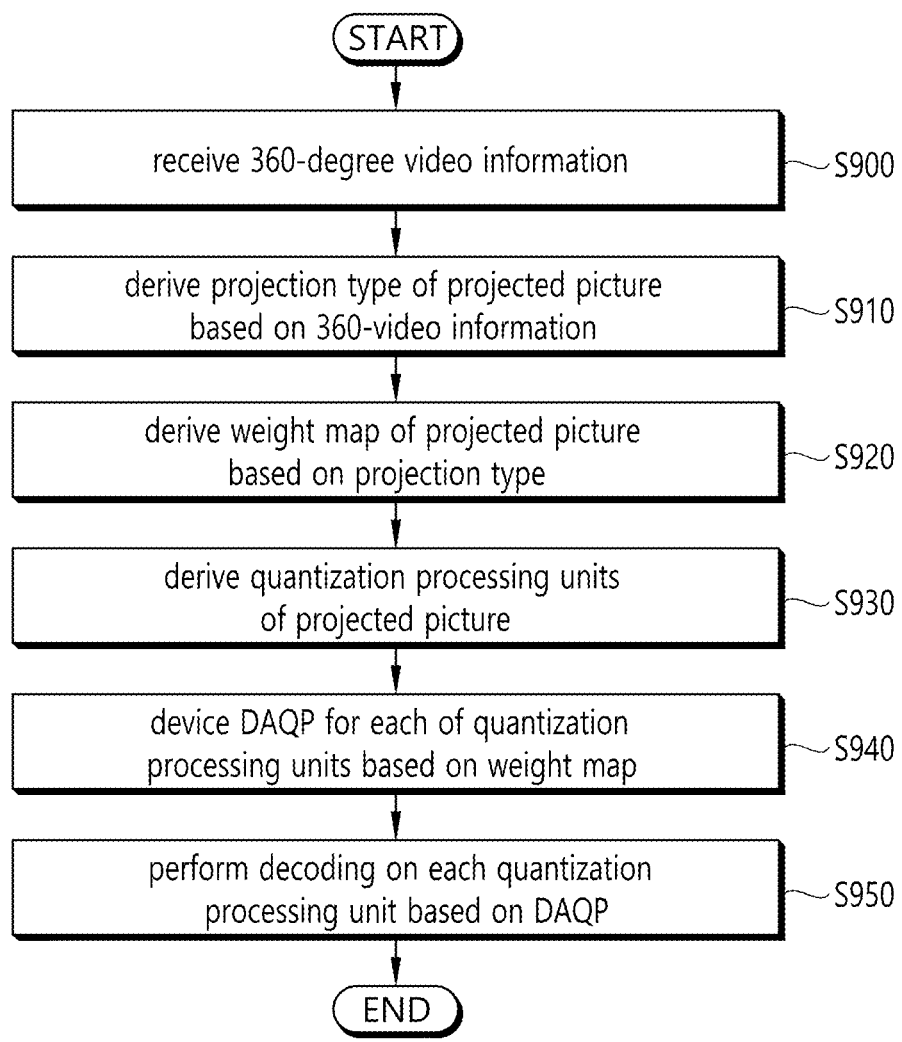

IMAGE DECODING METHOD AND APPARATUS USING PROJECTION-TYPE BASED QUANTISATION PARAMETERS IN IMAGE CODING SYSTEM FOR 360-DEGREE VIDEO

CROSS-REFERENCE TO RELATED APPLICATIONS

This application is the National Stage filing under 35 U.S.C. 371 of International Application No. PCT/KR2018/007542, filed on Jul. 4, 2018, which claims the benefit of U.S. Provisional Application No. 62/528,453 filed on Jul. 4, 2017, the contents of which are all hereby incorporated by reference herein in their entirety.

BACKGROUND OF THE DISCLOSURE

Field of the Disclosure

The present disclosure relates to a 360-degree video, and more particularly, to an image decoding method and apparatus using a projection type-based quantization parameter in a coding system for the 360-degree video.

Related Art

A 360-degree video may imply video or image content required to provide a virtual reality (VR) system and captured or reproduced simultaneously in all directions (360 degrees). For example, the 360-degree video may be represented on a 3-dimensional spherical surface. The 360-degree video may be provided through a process of capturing an image or video for each of a plurality of time points through one or more cameras, connecting the captured plurality of images/videos to create one panoramic image/video or spherical image/video and projecting it on a 2D picture, and coding and transmitting the projected picture.

An amount of information or bits to be transmitted is relatively increased in the 360-degree video, compared to the conventional image data. Therefore, if the image data is transmitted by using a medium such as the conventional wired/wireless broadband line or if the image data is stored by using the conventional storage medium, transmission cost and storage cost are increased.

Accordingly, there is a need for a highly efficient image compression technique for effectively transmitting, storing, and reproducing 360-degree video information.

SUMMARY

The present disclosure provides a method and apparatus for increasing efficiency of 360-degree video information transmission for providing a 360-degree video.

The present disclosure also provides a method and apparatus for deriving a decoder side adaptive quantization parameter (DAQP) for a quantization processing unit of a projected picture for a 360-degree video.

The present disclosure also provides a method and apparatus for deriving an updated DAQP for a quantization processing unit adjacent to a specific boundary at which discontinuity of a projected picture occurs.

According to an embodiment of the present disclosure, there is provided an intra prediction method performed by an encoding apparatus. The method includes obtaining 360-degree video data captured by at least one camera, obtaining a projected picture by processing the 360-degree video data, deriving a weight map of the projected picture based on the projection type, deriving quantization processing units of the projected picture, deriving a DAQP for each of the quantization processing units based on the weight map, and performing quantization on each of the quantization processing units based on the DAQP, and encoding and outputting 360-degree video information on the projected picture.

According to another embodiment of the present disclosure, there is provided an encoding apparatus performing intra prediction. The encoding apparatus includes a projection processing unit obtaining 360-degree video data captured by at least one camera, and obtaining a projected picture by processing the 360-degree video data, a quantization unit deriving a weight map of the projected picture based on the projection type, deriving quantization processing units of the projected picture, deriving a DAQP for each of the quantization processing units based on the weight map, and performing quantization on each of the quantization processing units based on the DAQP, and an entropy encoring unit encoding and outputting 360-degree video information on the projected picture.

According to another embodiment of the present disclosure, there is provided a video decoding method performed by a decoding apparatus. The method includes receiving 360-degree video information, deriving a projection type of a projected picture based on the 360-degree video information, deriving a weight map of the projected picture based on the projection type, deriving quantization processing units of the projected picture, deriving a DAQP for each of the quantization processing units based on the weight map, and decoding the respective quantization processing units based on the DAQP.

According to another embodiment of the present disclosure, there is provided a decoding apparatus performing video decoding. The decoding apparatus includes an entropy decoding unit receiving 360-degree video information, and a de-quantization unit deriving a projection type of a projected picture based on the 360-degree video information, deriving a weight map of the projected picture based on the projection type, deriving quantization processing units of the projected picture, deriving a DAQP for each of the quantization processing units based on the weight map, and decoding the respective quantization processing units based on the DAQP.

According to the present disclosure, a DAQP for a quantization processing unit can be derived based on a projection type of a projected picture for a 360-degree video. Therefore, a quantization process can be performed by reflecting a geometric structure, and an overall coding efficiency can be improved.

According to the present disclosure, an updated DAQP for a quantization processing unit adjacent to a specific boundary of a face in which discontinuity of a projected picture occurs can be derived. Therefore, an artifact caused by discontinuity of the projected picture can be reduced, and overall coding efficiency can be improved.

BRIEF DESCRIPTION OF THE DRAWINGS

FIG. 2 exemplarily illustrates a process of 360-degree video processing in an encoding device and a decoding device.

FIG. 7a to FIG. 7d illustrate CTUs in which an updated DAQP around a boundary of faces in a projected picture is derived.

FIG. 8 briefly illustrates a video encoding method performed by an encoding device according to the present disclosure.

FIG. 9 briefly illustrates a video decoding method performed by a decoding device according to the present disclosure.

DESCRIPTION OF EXEMPLARY EMBODIMENTS

Figure 1:
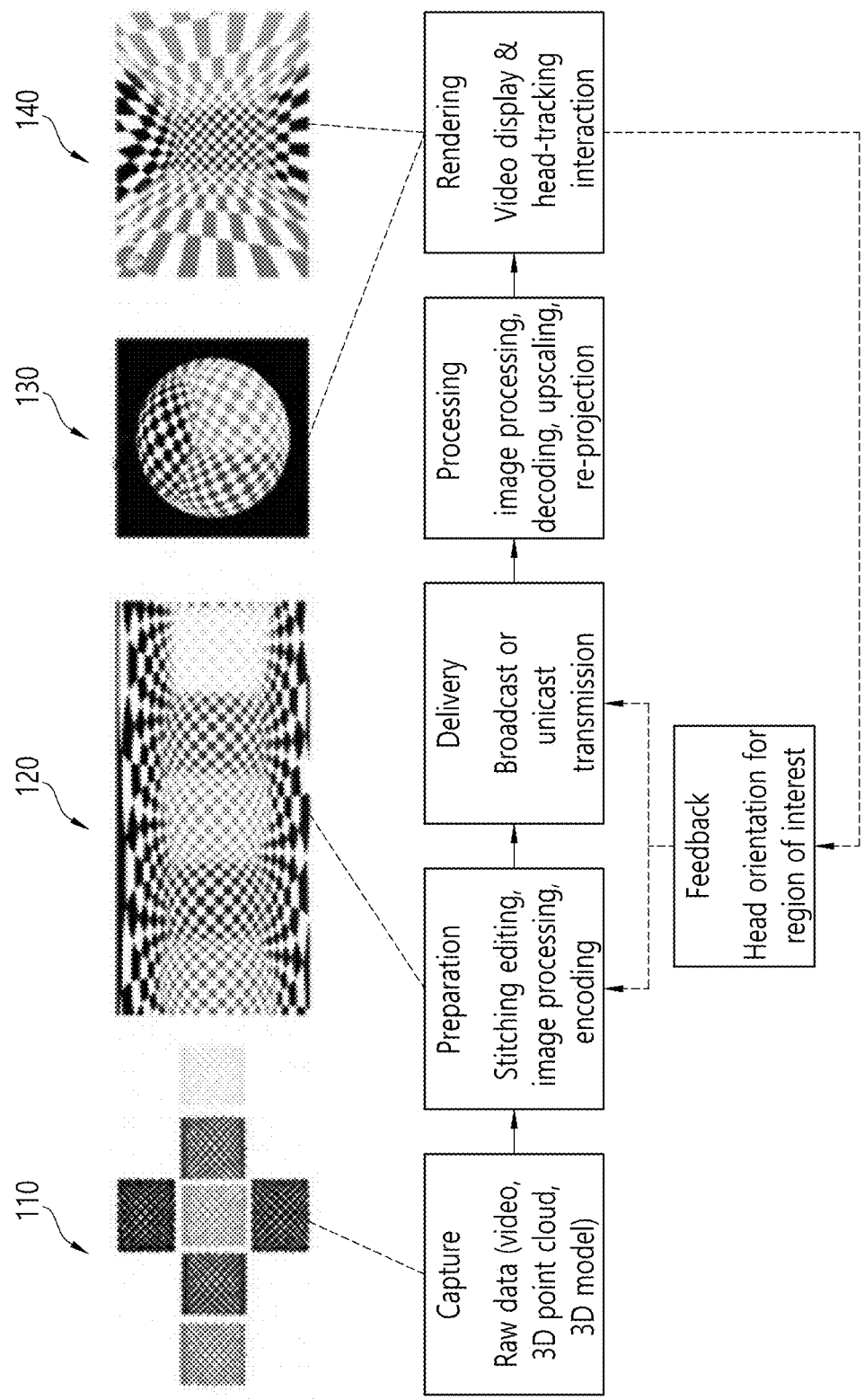
FIG. 1 is a view illustrating overall architecture for providing a 360-degree video according to the present disclosure.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a view illustrating overall architecture for providing a 360-degree video according to the present disclosure.

The present disclosure proposes a method of providing 360-degree content in order to provide virtual reality (VR) to users. VR may refer to technology for replicating actual or virtual environments or those environments. VR artificially provides sensory experience to users and thus users can experience electronically projected environments.

360 content refers to content for realizing and providing VR and may include a 360-degree video and/or 360-degree audio. The 360-degree video may refer to video or image content which is necessary to provide VR and is captured or reproduced omnidirectionally (360 degrees). Hereinafter, the 360-degree video may refer to 360-degree video. A 360-degree video may refer to a video or an image represented on 3D spaces in various forms according to 3D models. For example, a 360-degree video can be represented on a spherical surface. The 360-degree audio is audio content for providing VR and may refer to spatial audio content whose audio generation source can be recognized to be located in a specific 3D space. 360 content may be generated, processed and transmitted to users and users can consume VR experiences using the 360 content.

Particularly, the present disclosure proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame or a projected picture according to context. Projection on a 2D image may be referred to as mapping to a 2D image. Projected image/video data may have the form of a 2D image 120 in FIG. 1.

Also, in the projection process, a process of partitioning the video data projected on the 2D image by region and applying the process may be applied. Here, regions may refer to divided areas of a 2D image. The region may correspond to a face or a tile. Regions can be obtained by dividing a 2D image equally or arbitrarily according to an embodiment. Further, regions may be divided according to a projection scheme in an embodiment.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

FIG. 2 exemplarily illustrates a process of 360-degree video processing in an encoding device and a decoding device. (a) of FIG. 2 may illustrate a process of input 360-degree video data processing performed by the encoding device. Referring to (a) of FIG. 2, a projection processor 210 may stitch and project the 360-degree video data at an input time on a 3D projection structure according to various projection schemes, and may show the 360-degree video data projected on the 3D projection structure as a 2D image. That is, the projection processor 210 may stitch the 360-degree video data, and may project the data on the 2D image. Herein, the projection scheme may be called a projection type. The 2D image on which the 360-video data is projected may be represented as a projected frame or a projected picture. The projected picture may be divided into a plurality of faces according to the projection type. The face may correspond to a tile. The plurality of faces of the projected picture may have the same size and shape (e.g., triangle or square) according to a specific projection type. In addition, the face in the projected picture may have a different size and shape according to the projection type. The projection processor 210 may perform a process of rotating or re-arranging each of regions of the projected picture or changing a resolution of each region. An encoding device 220 may encode information on the projected picture and may output it through a bitstream. A process of encoding the projected picture by the encoding device 220 will be described in detail with reference to FIG. 3. Meanwhile, the projection processor 210 may be included in the encoding device, or the projection process may be performed by means of an external device.

(a) of FIG. 2 may illustrate a process of processing information on a projected picture for 360-degree video data, performed by a decoding device. The information on the projected picture may be received through a bitstream.

A decoding device 250 may decode the projected picture based on the received information on the projection picture. A process of decoding the projected picture by the decoding device 250 will be described in detail with reference to FIG. 4.

A re-projection processor 260 may re-project, on a 3D model, 360-degree video data on which the projected picture derived through the decoding process is projected. The re-projection processor 260 may correspond to the projection processor. In this process, the 360-degree video data projected on the projected picture may be re-projected on a 3D space. This process may be called mapping or projection according to context. The 3D space to be mapped in this case may have a different shape according to the 3D model. Examples of the 3D model may include sphere, cube, cylinder, or pyramid. Meanwhile, the re-projection processor 260 may be included in the decoding device 250, and the re-projection process may be performed by means of an external device. The re-projected 360-degree video data may be rendered on the 3D space.

Figure 3:
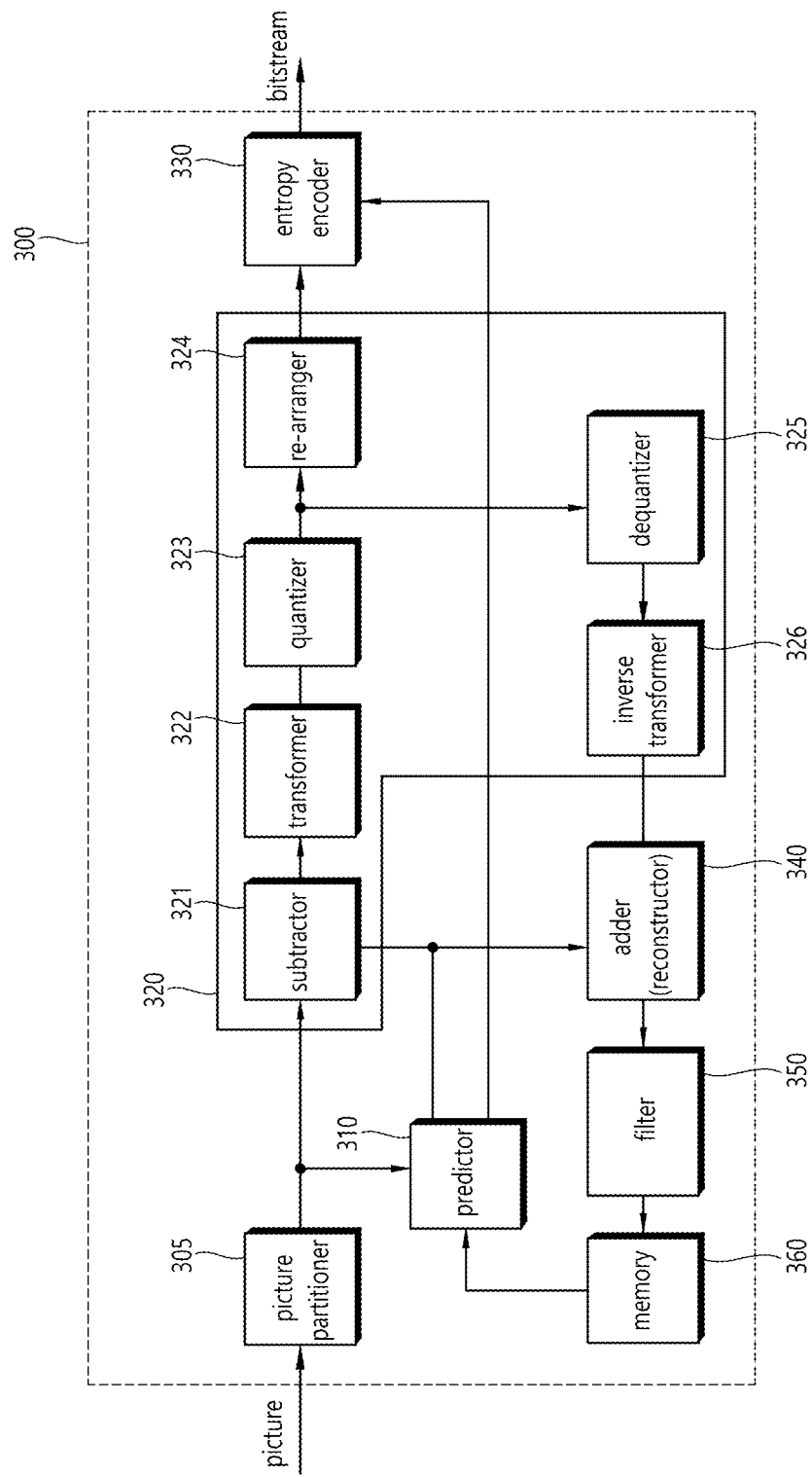
FIG. 3 briefly illustrates a structure of a video encoding device to which the present disclosure is applicable.

FIG. 3 briefly illustrates a structure of a video encoding device to which the present disclosure is applicable.

Referring to FIG. 3, a video encoding device 300 may include a picture partitioner 305, a predictor 310, a residual processor 320, an entropy encoder 330, an adder 340, a filter 350, and a memory 360. The residual processor 320 may include a subtractor 321, a transformer 322, a quantizer 323, a re-arranger 324, a dequantizer 325, an inverse transformer 326.

The picture partitioner 305 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 310 may perform prediction on a processing target block (hereinafter, a current block), and may generate a predicted block including prediction samples for the current block. A unit of prediction performed in the predictor 310 may be a coding block, or may be a transform block, or may be a prediction block.

The predictor 310 may determine whether intra-prediction is applied or inter-prediction is applied to the current block. For example, the predictor 310 may determine whether the intra-prediction or the inter-prediction is applied in unit of CU.

In case of the intra-prediction, the predictor 310 may derive a prediction sample for the current block based on a reference sample outside the current block in a picture to which the current block belongs (hereinafter, a current picture). In this case, the predictor 310 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 310 may determine the prediction mode to be applied to the current block by using the prediction mode applied to the neighboring block.

In case of the inter-prediction, the predictor 310 may derive the prediction sample for the current block based on a sample specified by a motion vector on a reference picture. The predictor 310 may derive the prediction sample for the current block by applying any one of a skip mode, a merge mode, and a motion vector prediction (MVP) mode. In case of the skip mode and the merge mode, the predictor 310 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 321 generates a residual sample which is a difference between an original sample and a prediction sample. If the skip mode is applied, the residual sample may not be generated as described above.

The transformer 322 transforms residual samples in units of a transform block to generate a transform coefficient. The transformer 322 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 323 may quantize the transform coefficients to generate quantized transform coefficients.

The re-arranger 324 rearranges quantized transform coefficients. The re-arranger 324 may rearrange the quantized transform coefficients in the form of a block into a one-dimensional vector through a coefficient scanning method. Although the re-arranger 324 is described as a separate component, the re-arranger 324 may be a part of the quantizer 323.

The entropy encoder 330 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 330 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 325 dequantizes values (transform coefficients) quantized by the quantizer 323 and the inverse transformer 326 inversely transforms values dequantized by the dequantizer 325 to generate a residual sample.

The adder 340 adds a residual sample to a prediction sample to reconstruct a picture. The residual sample may be added to the prediction sample in units of a block to generate a reconstructed block. Although the adder 340 is described as a separate component, the adder 340 may be a part of the predictor 310. Meanwhile, the adder 340 may be referred to as a reconstructor or reconstructed block generator.

The filter 350 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 350 may apply an adaptive loop filter (ALF) to the reconstructed picture. The ALF may be applied to the reconstructed picture to which deblocking filtering and/or sample adaptive offset has been applied.

The memory 360 may store a reconstructed picture (decoded picture) or information necessary for encoding/decoding. Here, the reconstructed picture may be the reconstructed picture filtered by the filter 350. The stored reconstructed picture may be used as a reference picture for (inter) prediction of other pictures. For example, the memory 360 may store (reference) pictures used for inter-prediction. Here, pictures used for inter-prediction may be designated according to a reference picture set or a reference picture list.

Figure 4:
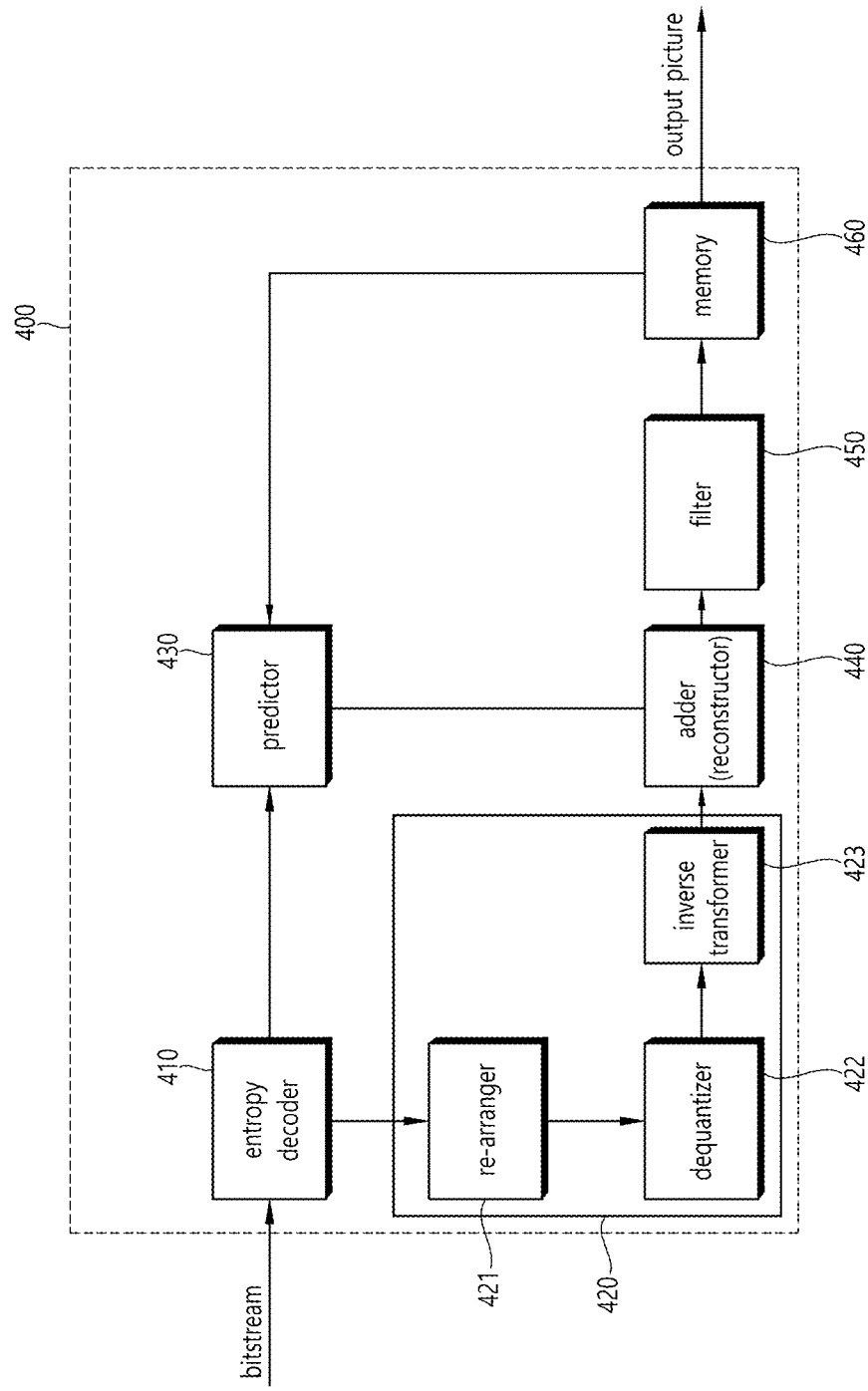
FIG. 4 briefly illustrates a structure of a video decoding device to which the present disclosure is applicable.

FIG. 4 briefly illustrates a structure of a video decoding device to which the present disclosure is applicable.

Referring to FIG. 4, a video decoding device 400 may include an entropy decoder 410, a residual processor 420, a predictor 430, an adder 440, a filter 450, and a memory 460. The residual processor 420 may include a re-arranger 421, a dequantizer 422, an inverse transformer 423.

When a bitstream including video information is input, the video decoding device 400 may reconstruct a video in association with a process by which video information is processed in the video encoding device.

For example, the video decoding device 400 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 410 may parse the bitstream to output information required for video reconstruction or picture reconstruction. For example, the entropy decoder 410 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 410 may be provided to the predictor 450 and residual values, that is, quantized transform coefficients, on which entropy decoding has been performed by the entropy decoder 410 may be input to the re-arranger 421.

The re-arranger 421 may rearrange the quantized transform coefficients into a two-dimensional block form. The re-arranger 421 may perform rearrangement corresponding to coefficient scanning performed by the encoding device. Although the re-arranger 421 is described as a separate component, the re-arranger 421 may be a part of the dequantizer 422.

The dequantizer 422 may de-quantize the quantized transform coefficients based on a (de)quantization parameter to output a transform coefficient. In this case, information for deriving a quantization parameter may be signaled from the encoding device.

The inverse transformer 423 may inverse-transform the transform coefficients to derive residual samples.

The predictor 430 may perform prediction on a current block, and may generate a predicted block including prediction samples for the current block. A unit of prediction performed in the predictor 430 may be a coding block or may be a transform block or may be a prediction block.

The predictor 430 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 430 may derive a prediction sample for a current block based on a neighboring reference sample in a current picture. The predictor 430 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 430 may derive a prediction sample for a current block based on a sample specified in a reference picture according to a motion vector. The predictor 430 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 430 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 430 may derive the motion vector of the current block using the merge index.

When the Motion vector Prediction (MVP) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 430 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 430 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 440 may add a residual sample to a prediction sample to reconstruct a current block or a current picture. The adder 440 may reconstruct the current picture by adding the residual sample to the prediction sample in units of a block. When the skip mode is applied, a residual is not transmitted and thus the prediction sample may become a reconstructed sample. Although the adder 440 is described as a separate component, the adder 440 may be a part of the predictor 430. Meanwhile, the adder 440 may be referred to as a reconstructor or reconstructed block generator.

The filter 450 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 460 may store a reconstructed picture (decoded picture) or information necessary for decoding. Here, the reconstructed picture may be the reconstructed picture filtered by the filter 450. For example, the memory 460 may store pictures used for inter-prediction. Here, the pictures used for inter-prediction may be designated according to a reference picture set or a reference picture list. A reconstructed picture may be used as a reference picture for other pictures. The memory 460 may output reconstructed pictures in an output order.

Meanwhile, unlike a picture of the conventional 2D image, a projected picture of a 360-degree video which is a 3D image is a picture derived when 360-degree video data on a 3D space is projected on the 2D image. Therefore, non-uniform sampling may be applied to the projected picture. A non-uniform sampling property of the projected picture may result in non-uniform quantization distortion. Therefore, a method of performing a quantization process according to an adaptive quantization parameter (QP) based on a geometry structure, i.e., a 3D projection structure, can more improve coding efficiency than a method of performing the quantization process of the projected picture based on the same QP. Accordingly, the present disclosure proposes a method of performing the quantization process based on the adaptive QP derived based on the 3D projection structure. In addition, discontinuity of the picture on which the 360-degree video data is projected based on the adaptive QP, that is, discontinuity between faces of the projected picture, can be effectively mitigated, thereby deriving improved subjective quality.

Figure 5:
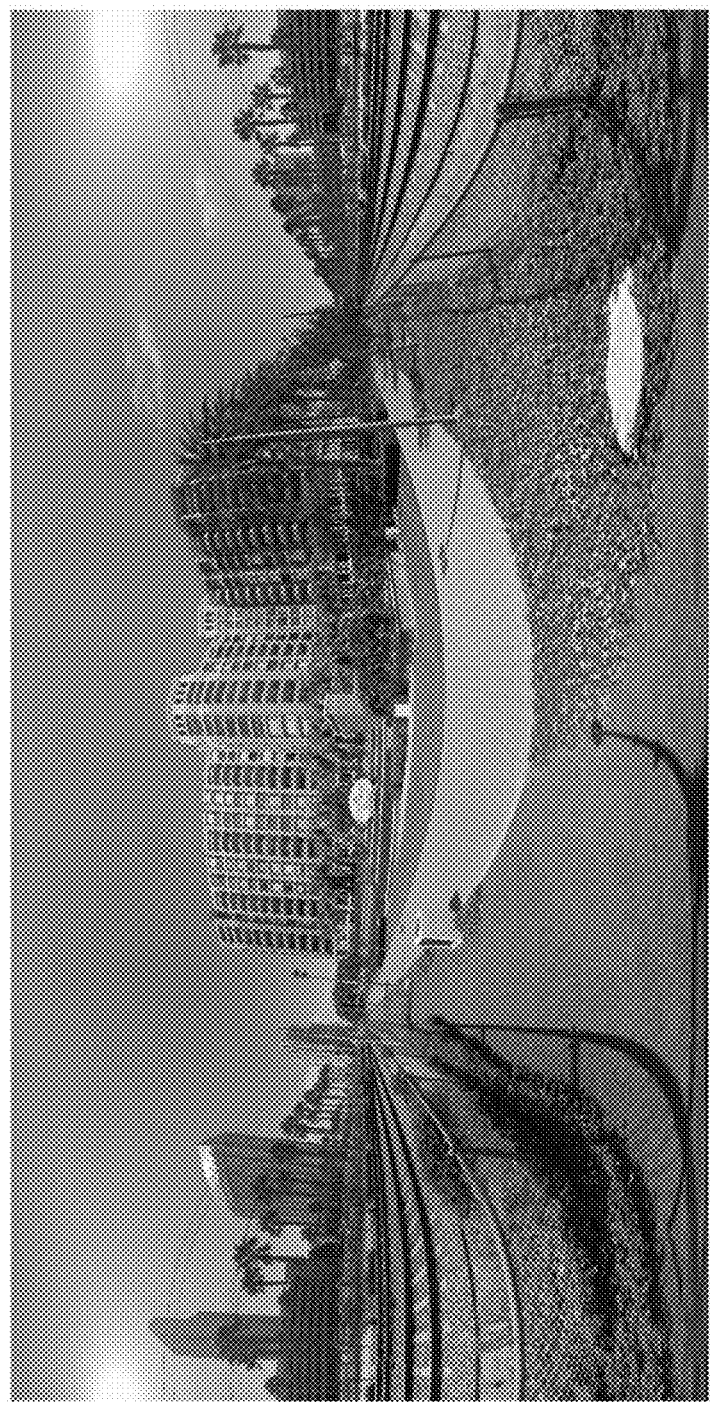
FIG. 5 exemplarily illustrates a projected picture derived based on the ERP.

FIG. 5 exemplarily illustrates a projected picture derived based on the ERP. 360-degree video data may be projected on a 2D picture. Herein, the 2D picture on which the 360-degree video data is projected may be called a projected frame or a projected picture. The 360-degree video data may be projected on a picture through various projection types. For example, the 360-degree video data may be projected and/or packed on the picture through equirectangular projection (ERP), cube map projection (CMP), icosahedral projection (ISP), octahedron projection (OHP), truncated square pyramid projection (TSP), segmented sphere projection (SSP), or equal area projection (EAP). Specifically, stitched 360-degree video data may be represented on the 3D projection structure based on the projection type, that is, the 360-degree video data may be mapped on a face of the 3D projection structure of each projection type, and the face may be projected on the projected picture.

Referring to FIG. 5, the 360-degree video data may be projected on a 2D picture through ERP. When the 360-degree video data is projected through the ERP, for example, the stitched 360-degree data may be represented on a spherical surface, that is, the 360-degree video data may be mapped on the spherical surface, and may be projected as one picture of which continuity is maintained on the spherical surface. The 3D projection structure of the ERP may be a sphere having one face. Therefore, as shown in FIG. 5, the 360-degree video data may be mapped on one face in the projected picture.

In addition, for another example, the 360-degree video data may be projected through the CMP. The 3D projection structure of the CMP may be a cube. Therefore, when the 360-degree video data is projected through the CMP, the stitched 360-degree video data may be represented on the cube, and the 360-degree video data may be projected on the 2D image by being divided into a 3D projection structure of a hexahedral shape. That is, the 360-degree video data may be mapped on 6 faces of the cube, and the faces may be projected on the projected picture.

In addition, for another example, the 360-degree video data may be projected through the ISP. The 3D projection structure of the ISP may be an icosahedron. Therefore, when the 360-degree video data is projected through the ISP, the stitched 360-degree video data may be represented on the icosahedron, and the 360-degree video data may be projected on the 2D image by being divided into a 3D projection structure of an icosahedral shape. That is, the 360-degree video data may be mapped to 20 faces of the icosahedron, and the faces may be projected on the projected picture.

In addition, for another example, the 360-degree video data may be projected through the OHP. The 3D projection structure of the OHP may be an octahedron. Therefore, when the 360-degree video data is projected through the OHP, the stitched 360-degree video data may be represented on an octahedron, and the 360-degree video data may be projected on a 2D image by being divided into a 3D projection structure of an octahedron shape. That is, the 360-degree video data may be mapped on 8 faces of the octahedron, and the faces may be projected on the projected picture.

In addition, for another example, the 360-degree video data may be projected through the TSP. The 3D projection structure of the TSP may be a truncated square pyramid. Therefore, when the 360-degree video data is projected through the TSP, the stitched 360-degree video data may be represented on the truncated square pyramid, and the 360-degree video data may be projected on a 2D image by being divided into a 3D projection structure of the truncated square pyramid. That is, the 360-degree video data may be mapped on 6 faces of the truncated square pyramid, and the faces may be projected on the projected picture.

In addition, for another example, the 360-degree video data may be projected through the SSP. The 3D projection structure of the SSP may be a spherical surface having 6 faces. Specifically, the faces may include faces of two circular shapes for positive-pole regions and faces of four square block shapes for the remaining regions. Therefore, when the 360-degree video data is projected through the SSP, the stitched 360-degree video data may be represented on the spherical surface having 6 faces, and the 360-degree video data may be projected on a 2D image by being divided into a 3D projection structure of the spherical having 6 faces. That is, the 360-degree video data may be mapped to 6 faces of the spherical surface, and the faces may be projected on the projected picture.

In addition, for another example, the 360-degree video data may be projected through the EAP. The 3D projection structure of the EAP may be a sphere. Therefore, when the 360-degree video data is projected through the EAP, the stitched 360-degree video data may be represented on a spherical surface, that is, the 360-degree video data may be mapped on the spherical surface, and may be projected as one picture of which continuity is maintained on the spherical surface. That is, the 360-degree video data may be mapped to one face of the sphere, and the face may be projected on the projected picture. Herein, unlike the ERP, the EAP may represent a method in which a specific region of the spherical surface is projected on the projected picture with the same size as a size on the spherical surface.

Since the projected picture is derived in such a manner that 360-degree video data on the 3D projection structure (e.g., the spherical surface) is projected, distortion of each sample in the projected picture may be weighted based on a location of a 3D space (e.g., the spherical surface) corresponding to a location of each of the samples. For example, as shown in FIG. 5, among samples of the projected picture, sampling of samples at a location corresponding to an equator the spherical surface may be different from sampling of samples at a location corresponding to a positive pole of the spherical surface. Herein, the samples at the location corresponding to the equator of the spherical surface may represent samples located at a center row of the projected picture, and the samples at the location corresponding to the positive pole of the spherical surface may represent samples located at a first row and a last raw of the projected picture.

If the projected picture has a size of M×N, and a top-left sample position of the projected picture has an x-component of 0 and a y-component of 0, then an input sample value of a sample at a coordinate (i,j) may be y(i,j), and an output sample value thereof may be y'(i,j). A corresponding sample value on the spherical surface corresponding to the sample of the coordinate (i,j) may be w(i,j). A weighted mean squared error (WMSE) of the projected picture may be derived based on the following equation.

$$WMSE = \frac{1}{\sum_{i=0}^{M-1} \sum_{j=0}^{N-1} w(i,j)} \sum_{i=0}^{M-1} \sum_{j=0}^{N-1} (y(i,j) - y'(i,j))^2 * w(i,j) \quad \text{[Equation 1]}$$

Herein, WMSE denotes a weighted mean squared error of the projected picture, y(i,j) denotes an input sample value at a coordinate (i,j), y'(i,j) denotes an output sample value of a sample at the coordinate (i,j), and w(i,j) denotes a corresponding sample value on the spherical surface corresponding to the sample at the coordinate (i,j).

Meanwhile, a weight for a target sample may be derived based on a sample value of the target sample and a sample value of a corresponding sample on the spherical surface. The weight is a value which allows the sample value of the target sample to be the same as the sample value of the corresponding sample. A value obtained by multiplying the sample value of the target sample by the weight may be the same as the sample value of the corresponding sample. In addition, since the 360-degree video data may be projected on a picture through various projection types, the weight of the target sample in the projected picture may vary depending on a 3D projection structure of the projection type. The weights of the samples of the projected picture based on each projection type may be the same as the content described below.

Figure 6:
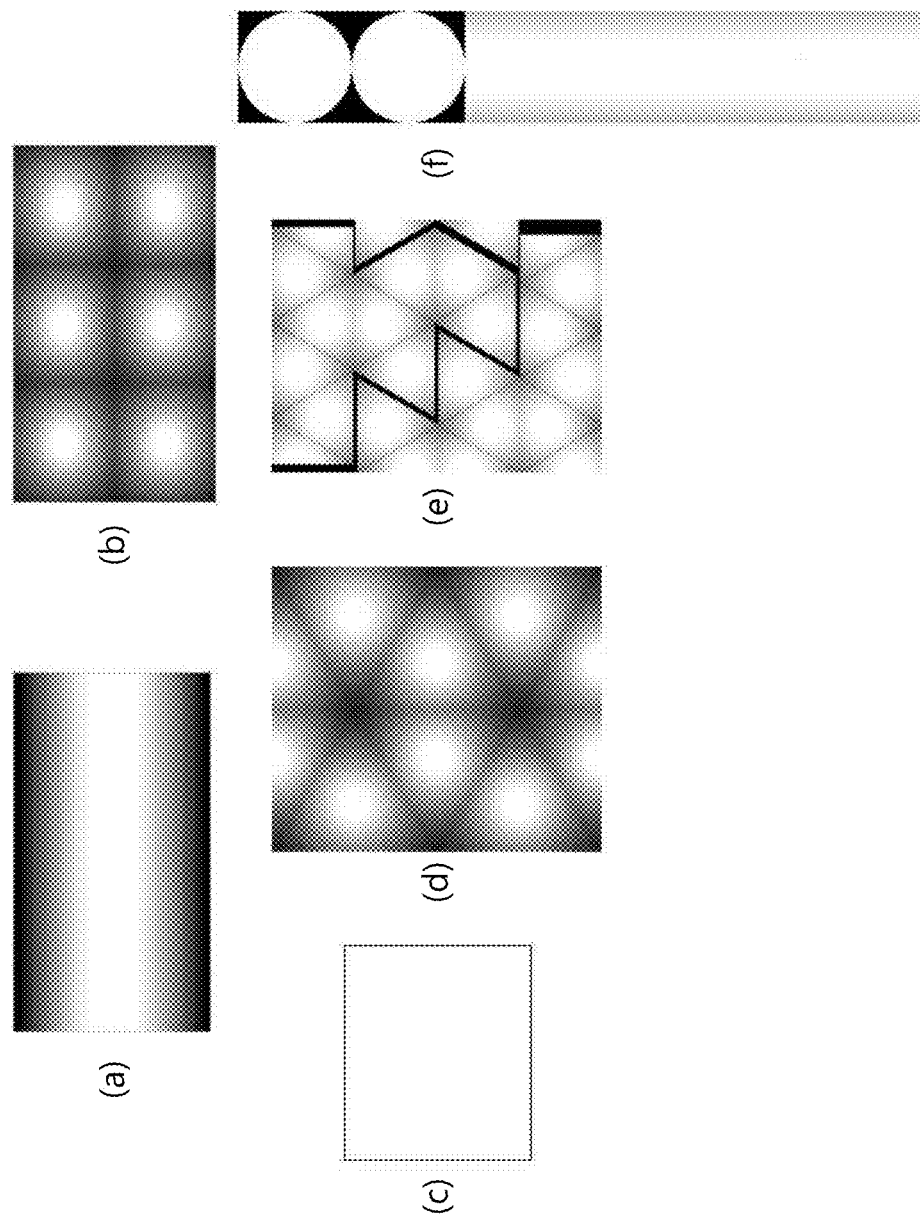
FIG. 6 illustrates a weight map of a projected picture based on a projection type.

FIG. 6 illustrates a weight map of a projected picture based on a projection type. The weight map may show weights of samples of the projected picture. A bright region of the weight map may show a sample having a sample value similar to a corresponding sample in a 3D projection structure, and a dark region of the weight map may show a sample having a sample value not similar to the corresponding sample in the 3D projection structure.

(a) of FIG. 6 may illustrate a weight map of a projected picture based on the ERP. As shown in (a) of FIG. 6, sample values in the projected picture based on the ERP may be the same as sample values in an actual 3D projection structure when closer to a center row of the projected picture, and may not be the same as the sample value in the actual 3D projection structure when farther from the center row of the projected picture.

(b) of FIG. 6 may illustrate a weight map of a projected picture based on the CMP. Specifically, (b) of FIG. 6 may illustrate a picture packed with faces of a cube to which the 360-degree video data is mapped with the 3×2 cube map, i.e., 3 columns and 2 rows. As shown in (b) of FIG. 6, sample values in the respective faces of the projected picture based on the CMP may be the same as sample values in the actual 3D projection structure when closer to a center of each of the faces, and may not be the same as the sample values in the actual 3D projection structure when farther from the center of each of the faces.

(c) of FIG. 6 may illustrate a weight map of a projected picture based on the EAP. As shown in (c) of FIG. 6, sample values of the projected picture based on the EAP may be the same as sample values in the actual 3D projection structure.

(d) of FIG. 6 may illustrate a weight map of a projected picture based on the OHP. Specifically, (d) of FIG. 6 may illustrate a picture compactly packed with faces of an octahedron to which the 360-degree video data is mapped, and the OHP may also be denoted by a compact OHP. As shown in (d) of FIG. 6, sample values in the respective faces of the projected picture based on the OHP may be the same as sample values in the actual 3D projection structure when closer to a center of each of the faces, and may not be the same as the sample values in the actual 3D projection structure when farther from the center of each of the faces.

(e) of FIG. 6 may illustrate a weight map of a projected picture based on the ISP. Specifically, (e) of FIG. 6 may illustrate a picture compactly packed with faces of an icosahedron to which the 360-degree video data is mapped, and the ISP may also be denoted by a compact ISP. As shown in (e) of FIG. 6, sample values in the respective faces of the projected picture based on the ISP may be the same as sample values in the actual 3D projection structure when closer to a center of each of the faces, and may not be the same as the sample values in the actual 3D projection structure when farther from the center of each of the faces.

(f) of FIG. 6 may illustrate a weight map of a projected picture based on the SSP. As shown in (f) of FIG. 6, sample values of a circular region to which 360-degree video data is mapped within faces for positive-pole regions among faces of the projected picture based on the SSP may be the same as sample values in the actual 3D projection structure, and sample values of the remaining regions may not be the same as the sample values in the actual 3D projection structure. In addition, as shown in (f) of FIG. 6, sample values within the remaining faces other than the faces for the positive-pole regions among the faces of the projected picture based on the SSP may be the same as sample values in the actual 3D projection structure when closer to a center column of the remaining faces, and may not be the same as the sample values in the actual 3D projection structure when farther from the center column of the remaining faces.

Since a weight of samples of the projected picture may vary depending on each projection type as described above, the present disclosure proposes a method of adaptively deriving a QP based on a weight depending on the projection type in a decoding device in order to decrease an overhead for transmission of decoding information and a seam artifact of the projected picture and to improve coding efficiency. The QP may be denoted by a decoder side adaptive quantization parameter (DAQP).

For example, information on parameters associated with the 360-degree video data may be transmitted through a high level syntax such as a sequence parameter set (SPS), a picture parameter set (PPS), or the like. Therefore, an encoding device and a decoding device may derive a weight map and a projection type for the projected picture based on the information. In addition, the encoding device and the decoding device may calculate the DAQP at a coding unit (CU) level, a coding tree unit (CTU) level, a slice level, and a tile level similarly to a delta QP algorithm used in the existing HEVC. In other words, the encoding device and the decoding device may calculate the DAQP in the CU unit, the CTU unit, the slice unit, or the tile unit based on the projection type and the weight map. That is, a processing unit of deriving the DAQP may be derived in the CU unit, the CTU unit, the slice unit, or the tile unit. The processing unit may be represented as a quantization processing unit. For example, when the DAQP is calculated in the CTU unit, a DAQP of a target CTU of the projected picture may be derived based on the following equation.

$$DAQP_i = QP_{init} - 3 \log_2(w_{avg}) \qquad \text{[Equation 2]}$$

Herein, $DAQP_i$ denotes a DAQP of the target CTU, $QP_{init}$ denotes an initial QP for the projected picture, and $w_{avg}$ denotes an average value of weights of samples of the target CTU. The existing QP of the target CTU may be derived based on the initial QP and a QP differential value of the transmitted target CTU, whereas the DAQP may be derived based on the average value of the weights of the samples of the target CTU. Accordingly, since information indicating the QP differential value may not be transmitted in the CTU unit, an amount of bits for information transmission for a decoding process can be increased, coding efficiency can be improved. Meanwhile, information on the initial QP may be transmitted through a picture parameter set (PPS), and the initial QP may be derived based on the information on the initial QP.

In addition, if the target CTU has a size of 2N×2N, $w_{avg}$ may be derived based on the following equation.

$$w_{avg} = (\Sigma w)/(2N \times 2N) \qquad \text{[Equation 3]}$$

Herein, $w_{avg}$ denotes an average value of weights of samples of the target CTU.

In addition, discontinuity of an image based on a 3D projection structure of a projection type for the projected picture may be considered when driving a DAQP of CTUs of the projected picture. Specifically, the decoding device may update the DAQP of CTUs adjacent to the boundary by considering the discontinuity at the boundary of the faces.

FIG. 7a to FIG. 7d illustrate CTUs in which an updated DAQP around a boundary of faces in a projected picture is derived. Specifically, a decoding device may perform signaling on information regarding a projection type of the projected picture, and may derive a structure of faces of the projected picture and a location at a boundary of the faces based on the information. Next, the decoding device may update a DAQP of CTUs adjacent to the boundary by considering discontinuity at the boundary of the faces. That is, CTUs in which the updated DAQP is derived may be derived based on the projection type of the projected picture, and the updated DAQP for the CTUs may be derived. The updated DAQP may be denoted by DAQP'. The DAQP' may be derived based on the following equation.

$$DAQP_i' = (DAQP_i + QP_{init}) >> 1 \qquad \text{[Equation 4]}$$

$DAQP_i'$ denotes an updated DAQP of a target CTU, $DAQP_i$ denotes a DAQP of the target CTU, and $QP_{init}$ denotes an initial QP for the projected picture.

Referring to FIG. 7a and FIG. 7b, CTUs in which DAQP' of the projected picture based on the ERP is derived may be shown. Meanwhile, FIG. 7a and FIG. 7b may illustrate a picture in which the 360-degree video data is projected based on the ERP and CTUs of the projected picture. The picture projected based on the ERP may include one face. As shown in FIG. 7a, DAQP' may be derived for CTUs adjacent to a left boundary and right boundary of the face in the projected picture based on the ERP. Alternatively, as shown in FIG. 7b, DAQP' may be derived for CTUs adjacent to a left boundary, right boundary, upper boundary, and lower boundary of the face in the projected picture based on the ERP.

Referring to FIG. 7c, CTUs in which DAQP' of the projected picture based on the CMP is derived may be shown. Meanwhile, FIG. 7c may illustrate a picture in which the 360-degree video data is projected based on the CMP and CTUs of the projected pictures. The projected picture based on the CMP may include 6 faces. As shown in FIG. 7c, DAQP' may be derived for CTUs adjacent to a discontinuous boundary on a 3D projection structure among boundaries between the faces in the projected picture based on the CMP. Specifically, DAQP' may be derived for CTUs adjacent to a left boundary, upper boundary, and lower boundary of a top-left face of the projected picture, an upper boundary and lower boundary of an upper face, a right boundary, upper boundary, and lower boundary of a top-right face, a left boundary, upper boundary, and lower boundary of a bottom-left face, an upper boundary and lower boundary of a lower face, and a right boundary, upper boundary, and lower boundary of a bottom-right face.

Referring to FIG. 7d, CTUs in which DAQP' of a projected picture based on the OHP is derived may be shown. Meanwhile, FIG. 7d may illustrate a picture in which the 360-degree video data is projected based on the OHP and CTUs of the projected picture. As shown in FIG. 7d, DAQP' may be derived for CTUs adjacent to a discontinuous boundary on a 3D projection structure among boundaries between the faces in the projected picture based on the OHP.

Meanwhile, the number of CTUs around the boundary at which the DAQP' is derived may be determined. The number of CTUs around the boundary at which the DAQP' is derived may be represented as depth. For example, if a depth level for the projected picture is 1, the DAQP' may be derived for a CTU adjacent to the boundary of a face of the projected picture, and if the depth level for the projected picture is 2, the DAQP' may be derived fir a CTU adjacent to the boundary of the face of the projected picture and a CTU adjacent to the CTU in an opposite direction of the boundary, i.e., two CTUs adjacent in an inner direction of the face at the boundary. If the depth level for the projected picture is 3, the DAQP' may be derived fir a CTU adjacent to the boundary of the face of the projected picture and CTUs adjacent to the CTU in an opposite direction of the boundary, i.e., three CTUs adjacent in an inner direction of the face at the boundary. FIG. 7a to FIG. 7d described above may illustrate a projected picture of which the depth level is 1.

Meanwhile, information for deriving DAQP of the projected picture may be represented as shown in the following table.

TABLE 1

|  | Descriptor |
|---|---|
| pic_parameter_set_rbsp( ) { |  |
| projection_format | u(3) |
| DAQP_enabled_flag | u(1) |
| DAQP_level | u(2) |
| DAQP_depth | U(2) |
| face_enable_flag | u(1) |
|   if face_enable_flag |  |
|     { face ( ) } |  |
|   ... |  |
| } |  |

Herein, projection_format denotes a syntax indicating a projection type of the projected picture, DAQP_enabled_flag denotes a syntax indicating whether a DAQP for a processing unit of deriving the DAQP of the projected picture is derived, DAQP_level denotes a syntax indicating the processing unit, and DAQP_depth denotes a syntax indicating the number of processing units around a specific boundary at which an updated DAQP, i.e., a DAQP', is derived.

For example, the projection_format may indicate one of the ERP, the CMP, the OHP, the ISP, the OHP, the TSP, the SSP, and the EAP as a projection type of the projected picture.

In addition, the DAQP_enabled_flag may indicate whether a DAQP for a processing unit of the projected picture is derived. If the DAQP_enabled_flag has a value of 1, the DAQP for the processing unit of the projected picture may be derived, and if the DAQP_enabled_flag has a value of 0, the DAQP for the processing unit of the projected picture may not be derived.

In addition, DAQP_level may indicate one of a CU, a CTU, and a slice in a processing unit for deriving the DAQP. For example, if the DAQP_level has a value of 0, the processing unit may be derived as the CU, and in this case, DAQP may be derived for each CU of the projected picture. In addition, if the DAQP_level has a value of 1, the processing unit may be derived as the CTU, and in this case, DAQP may be derived for each CTU of the projected picture. In addition, if the DAQP_level has a value of 2, the processing unit may be derived as the slice, and DAQP may be derived for each slice of the projected picture.

In addition, DAQP_depth may indicate the number of processing units around a specific boundary at which the DAQP' is derived in the projected picture. For example, if the DAQP_depth has a value of 0, the DAQP_depth may indicate that a depth level for the projected picture is 1, and DAQP' may be derived in the processing unit adjacent to the specific boundary in each row of a face of the projected picture. In addition, if the DAQP_depth has a value of 1, the DAQP_depth may indicate that the depth level for the projected picture is 2, and DAQP' may be derived in two processing units around the specific boundary in each row of a face of the projected picture. In addition, if the DAQP_Depth has a value of 2, the DAQP_depth may indicate that the depth level for the projected picture is 3, and DAQP' may be derived in three processing units around the specific boundary in each row of a face of the projected picture.

In addition, face_enabled_flag may indicate a syntax element indicating a face enabled flag, and face( ) may indicate a syntax element indicating information on the face. The face enabled flag may indicate whether the projected picture consists of a plurality of faces. For example, if the face enabled flag has a value of 1, the face enabled flag may indicate that the projected picture consists of a plurality of faces, and if the face enabled flag has a value of 0, the face enabled flag may indicate that the projected picture does not consist of the plurality of faces. If the face enabled flag has a value of 1, that is, if the face enabled flag indicates that the projected picture consists of the plurality of faces, information on a face of the projected picture may be signaled.

FIG. 8 briefly illustrates a video encoding method performed by an encoding device according to the present disclosure. The method disclosed in FIG. 8 may be performed by the encoding device disclosed in FIG. 3. Specifically, for example, S800 to S810 of FIG. 8 may be performed by a projection processing unit of the encoding device, S820 to S840 may be performed by a quantization unit of the encoding device, S850 may be performed by the quantization unit and prediction unit of the encoding device, and S860 may be performed by an entropy encoding unit of the encoding device.

The encoding device obtains 360-degree video data captured by at least one camera (S800). The encoding device may obtain the 360-degree video data captured by the at least one camera. The 360-degree video data may be a video captured by the at least one camera.

The encoding device obtains a projected picture by processing the 360-degree video data (S810). The encoding device may perform projection on a 2D image (or picture) according to a projection type for the 360-degree video data among several projection types, and may obtain the projected picture. The projection type may correspond to the aforementioned projection method, and the projected picture may also be called a projected frame. The several projection types may include equirectangular projection (ERP), cube map projection (CMP), icosahedral projection (ISP), octahedron projection (OHP), truncated square pyramid projection (TSP), segmented sphere projection (SSP), and equal area projection (EAP). The 360-degree video data may be mapped to faces of a 3D projection structure of each projection type, and the faces may be projected on the projected picture. That is, the projected picture may include faces of the 3D projection structure of each projection type. For example, the 360-degree video data may be projected on the projected picture based on cube map projection (CMP), and in this case, the 3D projection structure may be a cube. In this case, the 360-degree video data may be mapped to 6 faces of the cube, and the faces may be projected on the projected picture. For another example, the 360-degree video data may be projected on the projected picture based on icosahedral projection (ISP), and in this case, the 3D projection structure may be an icosahedron. For another example, the 360-degree video data may be projected on the projected picture based on octahedron projection (OHP), and in this case, the 3D projection structure may be an octahedron. In addition, the encoding device may perform a process of rotating or re-arranging each of faces of the projected picture or changing a resolution of each region.

The encoding device derives a weight map of the projected picture based on the projection type (S820). The weight map may include weights of samples of the projected picture based on the projection type. The weight of each sample is a value which allows a sample value of each of the samples to be the same as a sample value of a corresponding sample, and a value obtained by multiplying the sample value of each of the samples by the weight may be the same as the sample value of the corresponding sample. Herein, the corresponding sample may indicate a sample on the 3D projection structure corresponding to each of the samples. The weight map based on the projection type may be pre-stored. The weight map based on the projection type may be as shown in FIG. 6 described above. That is, weight maps for several projection types may be pre-stored, and a weight map for a projection type of a projected picture may be derived among the pre-stored weight maps.

The encoding device derives quantization processing units of the projected picture (S830). The encoding device may derive a quantization processing unit level of the projected picture, and may derive the quantization processing units as blocks corresponding to the quantization processing unit level. For example, the quantization processing unit level may be derived as a CTU, CU, face, or slice of the projected picture. Specifically, when the quantization processing unit level is derived as the CTU of the projected picture, the quantization processing units may be derived as blocks corresponding to the CTU. A size of the quantization processing units may be the same as a size of the CTU. For example, the size of the CTU may be a size of 128×128 or a size of 256×256.

For another example, when the quantization processing unit level is derived as the CU of the projected picture, the quantization processing units may be derived as blocks corresponding to the CU. A size of the quantization processing units may be the same as a size of the CU.

For another example, when the quantization processing unit level is derived as the face of the projected picture, the quantization processing units may be derived as blocks corresponding to the face. The size of the quantization processing units may be the same as the size of the face. For example, a size of the face may be a size of 960×960.

For another example, when the quantization processing unit level is derived as the slice of the projected picture, the quantization processing units may be derived as blocks corresponding to the slice. The size of the quantization processing units may be the same as a size of the slice.

Meanwhile, the encoding device may generate DAQP level information indicating a level of the quantization processing units. A syntax element for the DAQP level information may be denoted by a DAQP_level. The DAQP level information may indicate a coding tree unit (CTU), a coding unit (CU), a face, or a slice. For example, if the DAQP level information has a value of 0, the DAQP level information may indicate the CU, if the DAQP level information has a value of 1, the DAQP level information may indicate the CTU, and if the DAQP level information has a value of 2, the DAQP level information may indicate the slice.

The encoding device derives a decoder side adaptive quantization parameter (DAQP) for each of the quantization processing units based on the weight map (S940). The encoding device may derive an initial quantization parameter (QP) for the projected picture, and may derive weights of samples of each of the quantization processing units based on the weight map. Next, the encoding device may derive an average value of the weights, and may derive the DAQP of each of the quantization processing units based on the initial QP and the average value. The average value of the weights may be derived based on the Equation 3 above. In addition, the DAQP of each of the quantization processing units may be derived based on the Equation 2 above. Meanwhile, the encoding device may generate and encode information on the initial QP.

Meanwhile, the encoding device may derive an update region of the projected picture, and may derive an updated DAQP by updating the DAQP of the quantization processing unit included in the update region. The updated DAQP may be denoted by DAQP'. Specifically, the encoding device may derive a specific boundary of a face of the projected picture based on the projection type, and may derive an update region adjacent to the specific boundary based on the 360-degree video information. Information on a specific boundary of a face based on the projection type may be pre-stored. That is, information on a specific boundary of a face for several projection types may be pre-stored, and the specific boundary of the face of the projected picture may be derived based on the information on the specific boundary of the face for the projection type of the projected picture.

In addition, the update region may include a specific number of quantization processing units in an inner direction at the specific boundary. Herein, the specific number may indicate a depth of the update region. The encoding device may generate the specific number, i.e., DAQP depth information indicating a depth of the update region. For example, if the DAQP depth information has a value of 1, the update region may include one quantization processing unit in an inner direction from the specific boundary. If the DAQP depth information has a value of 2, the update region may include two quantization processing units in the inner direction from the specific boundary. If the DAQP depth information has a value of 3, the update region may include three quantization processing units in the inner direction from the specific boundary.

The encoding device may perform quantization on each of the quantization processing units based on the DAQP (S850). When decoding is performed on the quantization processing unit, the decoding device may derive prediction samples for the quantization processing unit, and may generate residual samples based on original samples and the derived prediction samples. In addition, the encoding device may derive transform coefficients by transforming residual samples for the respective quantization processing units, and may output information on a residual of each of the quantization processing units including the quantized transform coefficients by quantizing the transform coefficients based on the DAQP. That is, information of the residual may include quantized transform coefficients for the residual sample. The encoding device may derive a reconstructed sample based on the prediction sample and the residual sample. That is, the encoding device may derive the reconstructed sample by adding the prediction sample and the residual sample. In addition, the encoding device may encode information on the residual and output it in a bitstream format. The bitstream may be transmitted to the decoding device through a network or a storage medium.

The encoding device encodes and outputs 360-degree video information for the projected picture (S860). The encoding device may generate the 360-degree video information for the projected picture, and may output the 360-degree video information through a bitstream. The 360-degree video information may be signaled through a high level syntax such as a slice header, a sequence parameter set (SPS), or the like.

The 360-degree video information may include projection type information indicating the projection type of the projected picture. Herein, the projection type may be one of equirectangular projection (ERP), cube map projection (CMP), icosahedral projection (ISP), octahedron projection (OHP), truncated square pyramid projection (TSP), segmented sphere projection (SSP), and equal area projection (EAP). That is, the projection type of the projected picture may be one or several projection types, and the several projection types may include the aforementioned equirectangular projection (ERP), cube map projection (CMP), icosahedral projection (ISP), octahedron projection (OHP), truncated square pyramid projection (TSP), segmented sphere projection (SSP), and equal area projection (EAP).

In addition, the 360-degree video information may include DAQP level information indicating a level of quantization processing units. A syntax element for the DAQP level information may be denoted by a DAQP_level. The DAQP level information may indicate a coding tree unit (CTU), a coding unit (CU), a face, or a slice. For example, if the DAQP level information has a value of 0, the DAQP level information may indicate the CU, if the DAQP level information has a value of 1, the DAQP level information may indicate the CTU, and if the DAQP level information has a value of 2, the DAQP level information may indicate the slice. The quantization processing units may be derived as blocks corresponding to a level indicated by the DAQP level information. In addition, the DAQP level information may be received through a picture parameter set (PPS). Alternatively, the DAQP level information may be received through a high level syntax such as a slice header, a sequence parameter set (SPS), or the like.

In addition, the 360-degree video information may include DAQP depth information indicating a depth of an update region. The update region may include quantization processing units as many as a number corresponding to a value indicated by the DAQP depth information in an inner direction at the specific boundary.

In addition, the 360-degree video information may include a DAQP enabled flag. The DAQP enabled flag may indicate whether DAQP for each of the quantization processing units is derived based on a weight map. For example, if the DAQP enabled flag has a value of 1, the DAQP enabled flag may indicate that DAQP for each of the quantization processing units is derived based on the weight map, and if the DAQP enabled flag has a value of 0, the DAQP enabled flag may indicate that the DAQP for each of the quantization processing units is not derived based on the weight map. That is, if the DAQP enabled flag has a value of 1, the DAQP for each of the quantization processing units may be derived based on the weight map, and if the DAQP enabled flag has a value of 0, the DAQP for each of the quantization processing units may not be derived and the existing quantization parameter (QP) may be derived.

FIG. 9 briefly illustrates a video decoding method performed by a decoding device according to the present disclosure. The method disclosed in FIG. 9 may be performed by the decoding device disclosed in FIG. 4. Specifically, for example, S900 of FIG. 9 may be performed by an entropy decoding unit of the decoding device, S910 to S940 may be performed by a de-quantization unit of the decoding device, and S950 may be performed by the de-quantization unit and prediction unit of the decoding device.

The decoding device receives 360-degree video information (S900). The decoding device may receive the 360-degree video information through a bitstream.

The 360-degree video information may include projection type information indicating the projection type of the projected picture. The projection type of the projected picture may be derived based on the projection type information. Herein, the projection type may be one of equirectangular projection (ERP), cube map projection (CMP), icosahedral projection (ISP), octahedron projection (OHP), truncated square pyramid projection (TSP), segmented sphere projection (SSP), and equal area projection (EAP). That is, the projection type of the projected picture may be one or several projection types, and the several projection types may include the aforementioned equirectangular projection (ERP), cube map projection (CMP), icosahedral projection (ISP), octahedron projection (OHP), truncated square pyramid projection (TSP), segmented sphere projection (SSP), and equal area projection (EAP).

In addition, the 360-degree video information may include DAQP level information indicating a level of quantization processing units. A syntax element for the DAQP level information may be denoted by a DAQP_level. The DAQP level information may indicate a coding tree unit (CTU), a coding unit (CU), a face, or a slice. For example, if the DAQP level information has a value of 0, the DAQP level information may indicate the CU, if the DAQP level information has a value of 1, the DAQP level information may indicate the CTU, and if the DAQP level information has a value of 2, the DAQP level information may indicate the slice. The quantization processing units may be derived as blocks corresponding to a level indicated by the DAQP level information. In addition, the DAQP level information may be received through a picture parameter set (PPS). Alternatively, the DAQP level information may be received through a high level syntax such as a slice header, a sequence parameter set (SPS), or the like.

In addition, the 360-degree video information may include DAQP depth information indicating a depth of an update region. The update region may be a region adjacent to a specific boundary of a face of the projected picture. In addition, the update region may include quantization processing units as many as a number corresponding to a value indicated by the DAQP depth information in an inner direction at the specific boundary.

In addition, the 360-degree video information may include a DAQP enabled flag. The DAQP enabled flag may indicate whether DAQP for each of the quantization processing units is derived based on a weight map. For example, if the DAQP enabled flag has a value of 1, the DAQP enabled flag may indicate that DAQP for each of the quantization processing units is derived based on the weight map, and if the DAQP enabled flag has a value of 0, the DAQP enabled flag may indicate that the DAQP for each of the quantization processing units is not derived based on the weight map. That is, if the DAQP enabled flag has a value of 1, the DAQP for each of the quantization processing units may be derived based on the weight map, and if the DAQP enabled flag has a value of 0, the DAQP for each of the quantization processing units may not be derived and the existing quantization parameter (QP) may be derived.

The decoding device derives the projection type of the projected picture based on the 360-degree video information (S910). The 360-degree video information may include projection type information indicating the projection type of the projected picture, and the projection type of the projected picture may be derived based on the projection type information. Herein, the projection type may be one of equirectangular projection (ERP), cube map projection (CMP), icosahedral projection (ISP), octahedron projection (OHP), truncated square pyramid projection (TSP), segmented sphere projection (SSP), and equal area projection (EAP).

The 360-degree video data may be mapped to faces of a 3D projection structure of each projection type, and the faces may be projected on the projected picture. That is, the projected picture may include faces of the 3D projection structure of each projection type. For example, the projected picture may be a picture on which the 360-degree video data is projected based on the CMP. In this case, the 360-degree video data may be mapped to 6 faces of a cube having the 3D projection structure of the CMP, and the faces may be projected on the projected picture. For another example, the projected picture may be a picture on which the 360-degree video data is projected based on the ISP. In this case, the 360-degree video data may be mapped to 20 faces of the icosahedron having the 3D projection structure of the ISP, and the faces may be projected on the projected picture. For another example, the projected picture may be a picture on which the 360-degree video data is projected based on the OHP. In this case, the 360-degree video data may be mapped to 8 faces of the octahedron having a 3D projection structure of the OHP, and the faces may be projected on the projected picture.

The decoding device derives a weight map of the projected picture based on the projection type (S920). The weight map may include weights of samples of the projected picture based on the projection type. The weight of each sample is a value which allows a sample value of each of the samples to be the same as a sample value of a corresponding sample, and a value obtained by multiplying the sample value of each of the samples by the weight may be the same as the sample value of the corresponding sample. Herein, the corresponding sample may indicate a sample on the 3D projection structure corresponding to each of the samples. The weight map based on the projection type may be pre-stored. The weight map based on the projection type may be as shown in FIG. 6 described above. That is, weight maps for several projection types may be pre-stored, and a weight map for a projection type of a projected picture may be derived among the pre-stored weight maps.

The decoding device derives quantization processing units of the projected picture (S930). The decoding device may derive a quantization processing unit level of the projected picture, based on DAQP level information indicating a level of quantization processing units obtained from the bitstream. That is, the quantization processing unit level may be derived based on the DAQP level information of the projected picture. For example, the DAQP level information may indicate a coding tree unit (CTU), a coding unit (CU), a face, or a slice. That is, the quantization processing unit level may be derived as the CTU, CU, face, or slice of the projected picture based on the DAQP level information. The quantization processing units may be derived as blocks corresponding to the quantization processing unit level indicated by the DAQP level information. For example, when the quantization processing unit level is derived as the CTU of the projected picture, the quantization processing units may be derived as blocks corresponding to the CTU. A size of the quantization processing units may be the same as a size of the CTU. For example, the size of the CTU may be a size of 128×128 or a size of 256×256.

For another example, when the quantization processing unit level is derived as the CU of the projected picture, the quantization processing units may be derived as blocks corresponding to the CU. A size of the quantization processing units may be the same as a size of the CU.

For another example, when the quantization processing unit level is derived as the face of the projected picture, the quantization processing units may be derived as blocks corresponding to the face. The size of the quantization processing units may be the same as the size of the face. For example, a size of the face may be a size of 960×960.

For another example, when the quantization processing unit level is derived as the slice of the projected picture, the quantization processing units may be derived as blocks corresponding to the slice. The size of the quantization processing units may be the same as a size of the slice.

The decoding device derives a decoder side adaptive quantization parameter (DAQP) for each of the quantization processing units based on the weight map (S940). The decoding device may derive an initial quantization parameter (QP) for the projected picture, and may derive weights of samples of each of the quantization processing units based on the weight map. Next, the decoding device may derive an average value of the weights, and may derive the DAQP of each of the quantization processing units based on the initial QP and the average value. The average value of the weights may be derived based on the Equation 3 above. In addition, the DAQP of each of the quantization processing units may be derived based on the Equation 2 above. In addition, the initial QP may be derived based on information on the initial QP, and the information on the initial QP may be transmitted through a picture parameter set (PPS).

Meanwhile, the decoding device may derive an update region of the projected picture, and may derive an updated DAQP by updating the DAQP of the quantization processing unit included in the update region. The updated DAQP may be denoted by DAQP'. Specifically, the decoding device may derive a specific boundary of a face of the projected picture based on the projection type, and may derive an update region adjacent to the specific boundary based on the 360-degree video information. Information on a specific boundary of a face based on the projection type may be pre-stored. That is, information on a specific boundary of a face for several projection types may be pre-stored, and the specific boundary of the face of the projected picture may be derived based on the information on the specific boundary of the face for the projection type of the projected picture.

In addition, the 360-degree information may include DAQP depth information indicating a depth of the update region, and the update region may include quantization processing units as many as a number indicated by the DAQP depth information in an inner direction from the specific boundary. For example, if the DAQP depth information has a value of 1, the update region may include one quantization processing unit in an inner direction from the specific boundary. If the DAQP depth information has a value of 2, the update region may include two quantization processing units in the inner direction from the specific boundary. If the DAQP depth information has a value of 3, the update region may include three quantization processing units in the inner direction from the specific boundary.

The decoding device performs decoding on each of the quantization processing units based on the DAQP (S950). The decoding device may output transform coefficients obtained by de-quantizing transform coefficients for the respective quantization processing units based on the DAQP, and may derive residual samples for the respective quantization processing units by inversely transforming the de-quantized transform coefficients. In addition, the decoding device may generate prediction samples by predicting each of the quantization processing unit, and may generate reconstructed samples for the respective quantization processing units by adding the residual samples to the prediction samples.

Meanwhile, although not shown in the figure, in the presence of the residual samples for the respective quantization processing units, the decoding device may receive information on a residual for each of the quantization processing units, and the information on the residual may be included in information on the face. The information on the residual may include the transform coefficient for the residual sample. The decoding device may derive the residual sample (or a residual sample array) for the target block based on the residual information. The decoding device may generate a reconstructed sample based on the prediction sample and the residual sample, the may derive a reconstructed block or a reconstructed picture based on the reconstructed sample. Thereafter, as described above, the decoding device can optionally apply an in-loop filtering procedure such as a de-blocking filtering and/or SAO procedure to the reconstructed picture in order to improve subjective/objective image quality.

Meanwhile, although not shown in the figure, the decoding device may map 360-degree video data of the decoded projected picture to a 3D space. That is, the decoding device may re-project the projected picture to the 3D space.

According to the present disclosure described above, a decoder side adaptive quantization parameter (DAQP) for a quantization processing unit can be derived based on a projection type of a projected picture for a 360-degree video. Therefore, a quantization process can be performed by reflecting a geometric structure, and an overall coding efficiency can be improved.

In addition, according to the present disclosure, an updated DAQP for a quantization processing unit adjacent to a specific boundary of a face in which discontinuity of a projected picture occurs can be derived. Therefore, an artifact caused by discontinuity of the projected picture can be reduced, and overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a read-only memory (ROM), a random access memory (RAM), a flash memory, a memory card, a storage medium, and/or other storage device.

What is claimed is:

1. A video decoding method performed by a decoding apparatus, the method comprising:
   receiving 360-degree video information;
   deriving a projection type of a projected picture based on the 360-degree video information;
   deriving a weight map of the projected picture based on the projection type;
   deriving quantization processing units of the projected picture;
   deriving a Decoder side Adaptive Quantization Parameter (DAQP) for each of the quantization processing units based on the weight map; and
   decoding the respective quantization processing units based on the DAQP,
   wherein the weight map includes weights of samples of the projection picture based on the projection type,
   wherein the deriving of the DAQP for each of the quantization processing units based on the weight map includes:
   deriving an initial quantization parameter (QP) for the projected picture;
   deriving weights of samples of each of the quantization processing units based on the weight map, and deriving an average value of the weights;
   deriving the DAQP of each of the quantization processing units based on the initial QP and the average value;
   deriving a specific boundary of a face of the projected picture based on the projection type;
   deriving an update region adjacent to the specific boundary based on the 360-degree video information; and
   deriving updated DAQP by updating the DAQP of the quantization processing unit included in the update region.

2. The video decoding method of claim 1,
   wherein the 360-degree video information includes DAQP level information indicating a level of the quantization processing units, and
   wherein the quantization processing units are derived as blocks corresponding to the level indicated by the DAQP level information.

3. The video decoding method of claim 2, wherein the DAQP level information indicates a coding tree unit (CTU), a coding unit (CU), or a slice.

4. The video decoding method of claim 1,
   wherein the 360-degree video information includes projection type information indicating the projection type of the projected picture,
   wherein the projection type of the projected picture is derived based on the projection type information, and
   wherein the projection type is one of equirectangular projection (ERP), cube map projection (CMP), icosahedral projection (ISP), octahedron projection (OHP), segmented sphere projection (SSP), and equal area projection (EAP).

5. The video decoding method of claim 1, wherein the DAQP of each of the quantization processing units is derived based on the following equation:

$$DAQP_i = QP_{init} - 3 \log_2(w_{avg}),$$

where $DAQP_i$ is the DAQP of each of the quantization processing units, $QP_{init}$ is the initial QP for the projected picture, and $w_{avg}$ is the average value of the weights.

6. The video decoding method of claim 1,
wherein the 360-degree information includes DAQP depth information indicating a depth of the update region, and
wherein the update region includes quantization processing units as many as a number indicated by the DAQP depth information in an inner direction from the specific boundary.

7. The video decoding method of claim 1, wherein the updated DAQP is derived based on the following equation:

$$DAQP_i' = (DAQP_i + QP_{init}) >> 1,$$

where $DAQP_i'$ is the updated DAQP of the quantization processing unit included in the update region, $DAQP_i$ is the DAQP of the quantization processing unit included in the update region, and $QP_{init}$ is an initial QP for the projected picture.

8. The video decoding method of claim 1,
wherein the 360-degree video information includes a DAQP enabled flag, and
wherein the DAQP enabled flag indicates whether the DAQP for each of the quantization processing units is derived based on the weight map.

9. A decoding apparatus for performing video decoding, the apparatus comprising:
an entropy decoder configured to receive 360-degree video information; and
a de-quantizer configured to derive a projection type of a projected picture based on the 360-degree video information, to derive a weight map of the projected picture based on the projection type, to derive quantization processing units of the projected picture, to derive a decoder side adaptive quantization parameter (DAQP) for each of the quantization processing units based on the weight map, and to decode the respective quantization processing units based on the DAQP,
wherein the weight map includes weights of samples of the projection picture based on the projection type,
wherein the de-quantizer derives an initial quantization parameter (QP) for the projected picture, derives weights of samples of each of the quantization processing units based on the weight map, derives an average value of the weights, derives the DAQP of each of the quantization processing units based on the initial QP and the average value, derives a specific boundary of a face of the projected picture based on the projection type, derives an update region adjacent to the specific boundary based on the 360-degree video information, and derives updated DAQP by updating the DAQP of the quantization processing unit included in the update region.

10. The decoding apparatus of claim 9,
wherein the 360-degree video information includes DAQP level information indicating a level of the quantization processing units, and
wherein the quantization processing units are derived as blocks corresponding to the level indicated by the DAQP level information.

11. An encoding apparatus for performing video encoding, the apparatus comprising:
a projection processer configured to obtain 360-degree video data captured by at least one camera, and to obtain a projected picture by processing the 360-degree video data;
a quantizer configured to derive a weight map of the projected picture based on the projection type, to derive quantization processing units of the projected picture, to derive a decoder side adaptive quantization parameter (DAQP) for each of the quantization processing units based on the weight map, and to perform quantization on each of the quantization processing units based on the DAQP; and
an entropy encoder configured to encode and to output 360-degree video information on the projected picture,
wherein the weight map includes weights of samples of the projection picture based on the projection type,
wherein the quantizer derives an initial quantization parameter (QP) for the projected picture, derives weights of samples of each of the quantization processing units based on the weight map, derives an average value of the weights, derives the DAQP of each of the quantization processing units based on the initial QP and the average value, derives a specific boundary of a face of the projected picture based on the projection type, derives an update region adjacent to the specific boundary based on the 360-degree video information, and derives updated DAQP by updating the DAQP of the quantization processing unit included in the update region.

\* \* \* \* \*